US005576396A

United States Patent [19]
Wang et al.

[11] Patent Number: 5,576,396
[45] Date of Patent: Nov. 19, 1996

[54] LOW-HAZE IONOMERS OF COPOLYMERS OF α-OLEFINS, CARBOXYLIC ACID ESTERS, AND OPTIONAL COMONOMERS, AND PROCESSES FOR MAKING AND ACIDIFYING THESE IONOMERS

[75] Inventors: James H. Wang, Appleton, Wis.; David Rosendale, Mauriceville, Tex.; Victor P. Kurkov, San Rafael, Calif.; Leslie P. Theard, Houston, Tex.; Ta Y. Ching, Novato, Calif.; Lewis R. Compton; Tor H. G. Palmgren, both of Orange, Tex.; Mitchell P. Eichelberger, The Woodlands, Tex.

[73] Assignee: Chevron Chemical Company, San Ramon, Calif.

[21] Appl. No.: 330,290

[22] Filed: Oct. 27, 1994

Related U.S. Application Data

[63] Continuation-in-part of Ser. No. 144,173, Oct. 27, 1993, abandoned.

[51] Int. Cl.⁶ ........................................... C08F 8/42

[52] U.S. Cl. ................ 525/367; 525/330.2; 525/369
[58] Field of Search ....................... 525/367, 369

[56] References Cited

U.S. PATENT DOCUMENTS

| | | | |
|---|---|---|---|
| 4,638,034 | 1/1987 | McClain | 525/369 |
| 5,003,001 | 3/1991 | Hasenbein et al. | 525/367 |

*Primary Examiner*—Bernard Lipman
*Attorney, Agent, or Firm*—C. D. Holland; M. H. Michel

[57] ABSTRACT

Ionomer compositions which have improved optical properties are disclosed. These compositions comprise ionomers which can be represented as the polymerization product of alpha-olefins having from two to eight carbon atoms, esters of alpha, beta-ethylenically-unsaturated carboxylic acids, metal salts of acrylic and methacrylic acid, and optional alpha, beta-ethylenically-unsaturated comonomers which impart some desired polymer property or properties, such as acidity and/or solvent resistivity. Also disclosed are methods of making these ionomer compositions in a reactive extruder and treating the compositions with acid to impart acidity to the compositions or to only the surface of the compositions.

9 Claims, 4 Drawing Sheets

LOW-HAZE IONOMERS OF COPOLYMERS OF α-OLEFINS, CARBOXYLIC ACID ESTERS, AND OPTIONAL COMONOMERS, AND PROCESSES FOR MAKING AND ACIDIFYING THESE IONOMERS

This is a continuation-in-part of application Ser. No. 08/144,173 filed Oct. 27, 1993 now abandoned.

BACKGROUND

This invention provides new polymeric ionomer compositions which have low haze. Low haze makes the compositions especially suited for use in clear packaging films, in addition to the other applications in which ionomers are utilized. This invention also provides a method for making these new polymeric compositions and for modifying the acidity of the compositions.

The compositions comprise ionomers which can be represented as the polymerization product of alpha-olefins having from two to eight carbon atoms, esters of alpha, beta-ethylenically-unsaturated carboxylic acids, metal salts of acrylic and methacrylic acid, and optional alpha, beta-ethylenically-unsaturated comonomers which impart some desired polymer property or properties, such as acidity and/or solvent resistivity. These ionomer compositions can easily be formed into films.

Ionomers which can be formed into films and methods of making ionomers are known in the art. Although these previously-known ionomers have similar chemical constituents to the ionomer compositions of this invention, the known ionomers have significantly different properties from the compositions of this invention. In addition, the known processes for making ionomers are also quite different from the method of making compositions of the present invention. Japanese patent number Sho 49-31556 to Iwami et al., dated Aug. 22, 1974, discloses a process for making ionomers which comprises saponifying copolymers of ethylene and alpha, beta-ethylenically-unsaturated carboxylate esters with a basic metal compound in aliphatic alcohol or in an organic solvent containing an aliphatic alcohol. The copolymer is homogeneously or heterogeneously dispersed in the alcohol solution. The saponified product can be further acidified to provide a composition having acid groups. Although the ionomers which have acid functionality are said to have low haze, no haze values are provided for ionomers which have no acid functionality.

Japanese patent number Sho 53-134591 to Harada et al., dated Nov. 24, 1978, discloses a film made by the process of Sho 49-31556 which is said to be useful for stretch-wrap applications. Their ionomer comprises a copolymer having 90–98 mole percent ethylene, 9.7 to 2.0 mole percent of an alkyl ester of an unsaturated carboxylic acid, 0 to 2.5 mole percent of unsaturated carboxylic acid, and 0.3 to 2.5 mole percent of a metal salt of an unsaturated carboxylic acid. It is stated that their film has very good mechanical, thermal, and optical properties, but the film is limited to having less than 9.7 mole percent ester because blocking occurs between film layers. In addition, the copolymer is limited to a maximum of 2.5 mole percent metal salt of an unsaturated carboxylic acid due to the viscosity of the copolymer being too high to allow processing of the copolymer. All copolymers in the films of the examples contain an unsaturated carboxylic acid component, which, the patent states, are used to adjust the modulus of elasticity and transparency of the film.

U.S. Pat. No. 5,218,057, issued to V. Kurkov and L. Theard on Jun. 8, 1993 and which is incorporated by reference in its entirety, teaches a process for saponifying an ethylene alkyl acrylate copolymer which comprises adding an aqueous solution of an inorganic alkali metal base to a molten ethylene-alkyl acrylate copolymer and mixing the alkali metal base and copolymer at a temperature sufficient for saponification to take place and at which the ethylene-alkyl acrylate copolymer remains in a molten or fluid state. Copolymers made by this process have lower tensile strength, lower gloss, and much higher haze than the copolymers of the present invention.

U.S. Pat. No. 4,638,034 to McClain, dated Jan. 20, 1987 and which is incorporated by reference in its entirety, claims a process for preparing an ethylene-acrylic acid copolymer salt which comprises saponifying an ethylene-alkyl acrylate copolymer in the molten state, in the absence of solvent or water other than by-product alkanol, with alkali metal hydroxide or alkaline earth metal hydroxide under non-static mixing conditions so as to thereby form alkanol and an alkali metal or alkaline earth metal salt of ethylene-acrylic acid copolymer, and separately recovering the alkanol and the salt.

U.S. Pat. No. 3,970,626 to Hurst et al., dated Jul. 20, 1976, discloses a copolymer of ethylene, alkyl acrylate or methacrylate, and an alkali metal salt of acrylic or methacrylic acid. Although this patent is mainly concerned with forming copolymers which form stable aqueous emulsions, the patent states that the copolymer can be extruded into films of good flexibility. Copolymers in the examples are formed using a batch autoclave. It is stated that about a one-fold excess of sodium hydroxide over what is theoretically required is used to convert the ester groups.

U.S. Pat. No. 4,042,766 to Tatsukami et al., dated Aug. 16, 1977 and which is incorporated by reference in its entirety, provides a method for preparing ionically cross-linked copolymers comprising melt-blending a copolymer comprising 1) ethylene and 2) at least one alkyl acrylate or methacrylate where the alkyl is selected from the group consisting of isopropyl or tert-butyl, with 3) at least one metal compound selected from the group consisting of acetates, formates, and oxides of zinc, magnesium, calcium, and sodium, and maintaining the molten blend at a temperature of about 200° to 320° C. The patent states that high mixing efficiency is desirable in the reaction equipment to assure uniform dispersion of the metal compound into the ester copolymer and to assure quick evaporation of the low molecular-weight byproducts, such as by melt-blending the components. Per the patent, adequate mixing was provided by a 20 mm-diameter single-screw extruder having a retention time of about one minute, as illustrated in Example 1 of that patent.

U.S. Pat. No. 3,789,035 to Iwami et al., dated Jan. 29, 1974 and which is incorporated by reference in its entirety, discusses three methods for acidifying an ionomer of a copolymer of ethylene and an ester of an alpha, beta-ethylenically-unsaturated carboxylic acid. The ionomer is made by saponifying a copolymer of ethylene and an ester of an alpha, beta-ethylenically-unsaturated carboxylic acid with a basic metal compound in a solvent containing an alcohol. The patent states that the alcohol is used to promote the reaction of the basic metal compound with the copolymer. The ionomer is then acidified by either 1) adding acid and replacing some of the basic metal with hydrogen; 2) melt-blending a polymer having acid groups with an ionomer; or 3) exchanging a non-alkali metal ion with the alkali metal ion on the ionomer which has been dispersed in a solvent.

U.S. Pat. No. 3,264,272 to Rees, dated Aug. 2, 1966, claims a composition comprising a random copolymer of an alpha-olefin having from two to ten carbon atoms, an alpha, beta-ethylenically-unsaturated carboxylic acid having from three to eight carbon atoms in which 10 to 90 percent of the acid is neutralized with metal ions, and an optional third mono-ethylenically unsaturated comonomer such as methyl methacrylate or ethyl acrylate. This copolymer is acidic due to the carboxylic acid groups present in the copolymer. U.S. Pat. No. 3,404,134 discloses the process for making these compositions, which comprises reacting an ethylene acrylic acid copolymer with a metal compound at a pressure between 100 and 10,000 psi and a temperature above the melt-point of the copolymer.

U.S. Pat. No. 5,189,113 to Muehlenbernd et al., dated Feb. 23, 1993, discloses a process for making ionically cross-linked copolymers of ethylene and alpha, beta-ethylenically-unsaturated carboxylic acids or alpha, beta-ethylenically-unsaturated comonomers donating carboxyl groups, such as anhydrides. This process requires reacting the copolymer with a solid metal compound in a mixing zone of a twin-screw extruder and subsequently pumping in water. The advantages for this process are said to be that no discoloration of the ionomer occurs because no corrosion of the twin-screw extruder occurs, and no specks of unreacted solid metal compound are found in the ionomer film.

U.S. Pat. No. 5,003,001 to Hasenbein et al., dated Mar. 26, 1991, claims a process for making ionically cross-linked copolymers of ethylene and alpha, beta-ethylenically-unsaturated carboxylic acids or alpha, beta-ethylenically-unsaturated comonomers donating carboxyl groups, such as anhydrides. This process reacts the copolymer with an aqueous metal salt solution in a first reaction zone at a temperature from 140° to 180° C. to form ionomer and completely devolatilizes the ionomer in a second, three-stage devolatilization zone at a temperature from 200° to 270° C. This process is said to provide odor-free ionomer film which is free of specks.

Although there has been much research in the area of ionomers, what has been lacking in the prior art is optically clear ionomers comprising copolymers of alpha olefins having two to eight carbon atoms, esters of alpha, beta-ethylenically-unsaturated carboxylic acids, and metal salts of alpha, beta-ethylenically-unsaturated carboxylic acids as well as methods of making those ionomers. This invention provides such compositions and methods.

SUMMARY OF THE INVENTION

In one embodiment, the invention comprises a copolymer of alpha-olefins having from two to eight carbon atoms, esters of alpha, beta-ethylenically-unsaturated carboxylic acids having from four to twenty-two carbon atoms, and metal salts of acrylic or methacrylic acid, wherein this copolymer has a haze of no more than ten percent as measured by ASTM method D 1003.

In one preferred embodiment, the invention comprises a copolymer of ethylene, methyl acrylate, and sodium salt of acrylic acid, wherein the haze of the copolymer is no more than five percent.

In another embodiment, the invention comprises a method of making an ionomer composition. This method comprises contacting a Group IA metal-containing solution with a molten or fluid copolymer comprising alpha-olefins having from two to eight carbon atoms and esters of alpha, beta-ethylenically-unsaturated carboxylic acids having from four to twenty two carbon atoms and having a melt index between about 100 and about 2000 g/10 min., as measured by ASTM method D 1239 at 190° C. using a 2.16 kg weight; and intensively mixing the copolymer and Group IA metal-containing solution at a temperature and to an extent which provides an ionomer composition having no more than ten percent haze.

In another embodiment, the invention comprises a method of reducing the water solubility of an ionomer composition formed into a shape such as strands, pellets, or film, which method comprises contacting a surface of the shape with an acid.

Among other factors, the present invention is based on our finding that films of the composition as described herein have very low haze, particularly when the films are made after saponifying a copolymer as described above under conditions which include intensive mixing, a greater extent of saponification, and higher reaction temperatures. Film haze is no more than ten percent, and many films have a haze of no more than five or even two percent. Furthermore, in a preferred embodiment, the composition has improved properties such as improved tensile strength, hot tack strength, and/or heat seal strength over ionomers of similar composition.

In addition to the properties discussed above, many of the compositions of this invention have no acidity, regardless of the extent of saponification. These advantages and others are further described below.

DESCRIPTION OF THE FIGURES

FIG. 2 illustrates that spherical and oblong ionic clusters or regions are present in the ionomer. This micrograph was also produced at a magnification factor of 8,000.

Figure 1:
FIG. 1 is a scanning electron micrograph of a freeze-fractured cross-section of 3-mil thick film made from an ionomer composition of this invention, taken at a magnification factor of 8,000.
Figure 2:
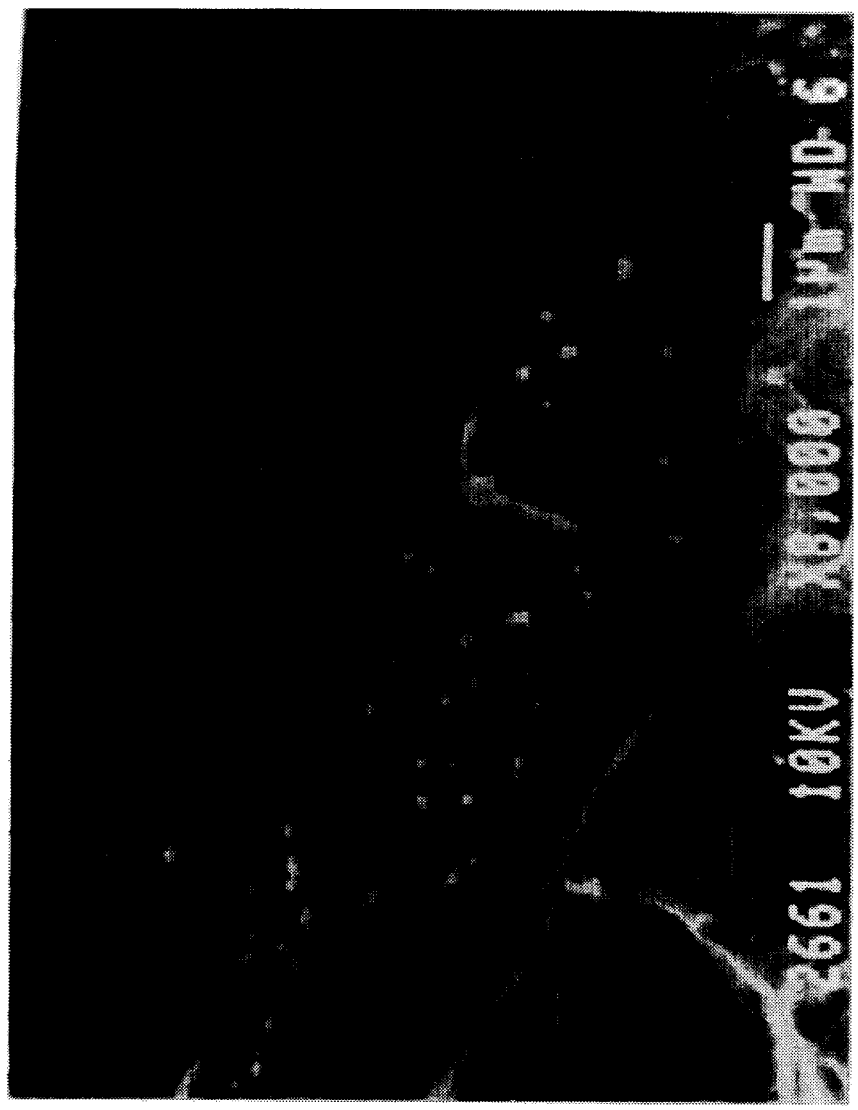
FIG. 2 is a scanning electron micrograph of a freeze-fractured cross-section of 3-mil thick film of ionomer of Comparative Example G.

A JEOL JSM-820 scanning electron microscope was used to generate the micrographs. The micrographs of FIGS. 1 and 2 show the fracture surface of films which were made by the blown film process of the examples.

Figure 3:
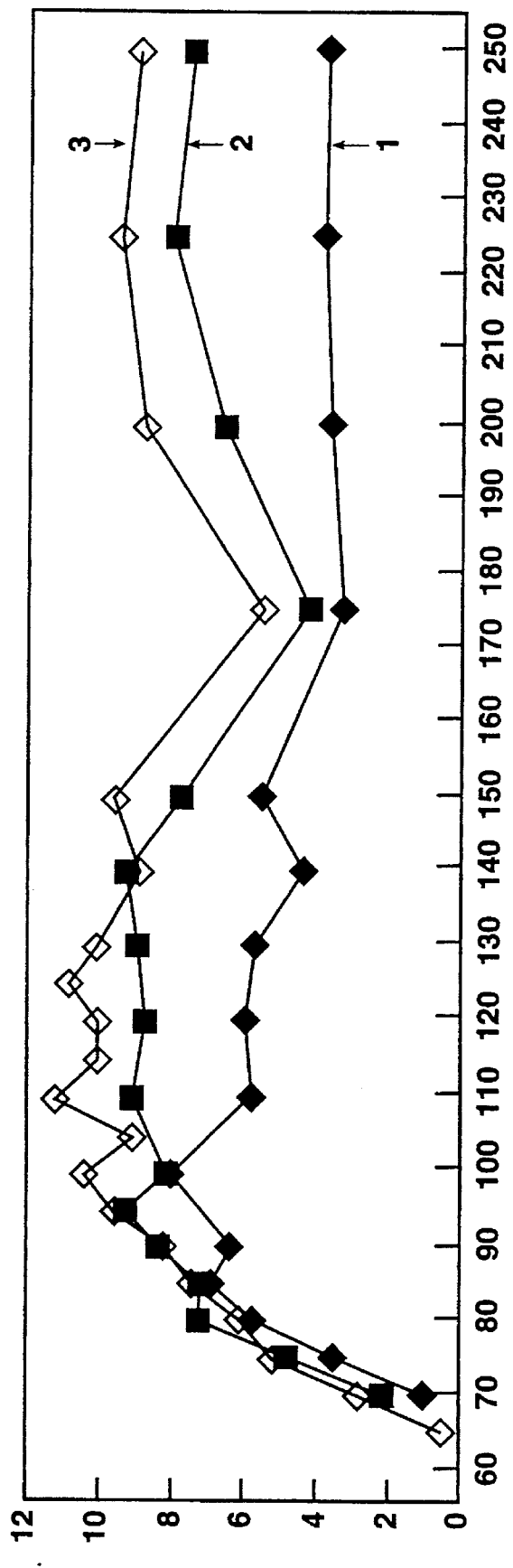

FIG. 3 shows the hot-tack of ionomer of this invention from Example 20 as a function of temperature. The ordinate is temperature in ° C., and the abscissa is hot-tack, measured in Newtons/inch. Line 1 is 35% hydrolyzed ionomer, line 2 is 42% hydrolyzed ionomer, and line 3 is 50% hydrolyzed ionomer.

Figure 4:
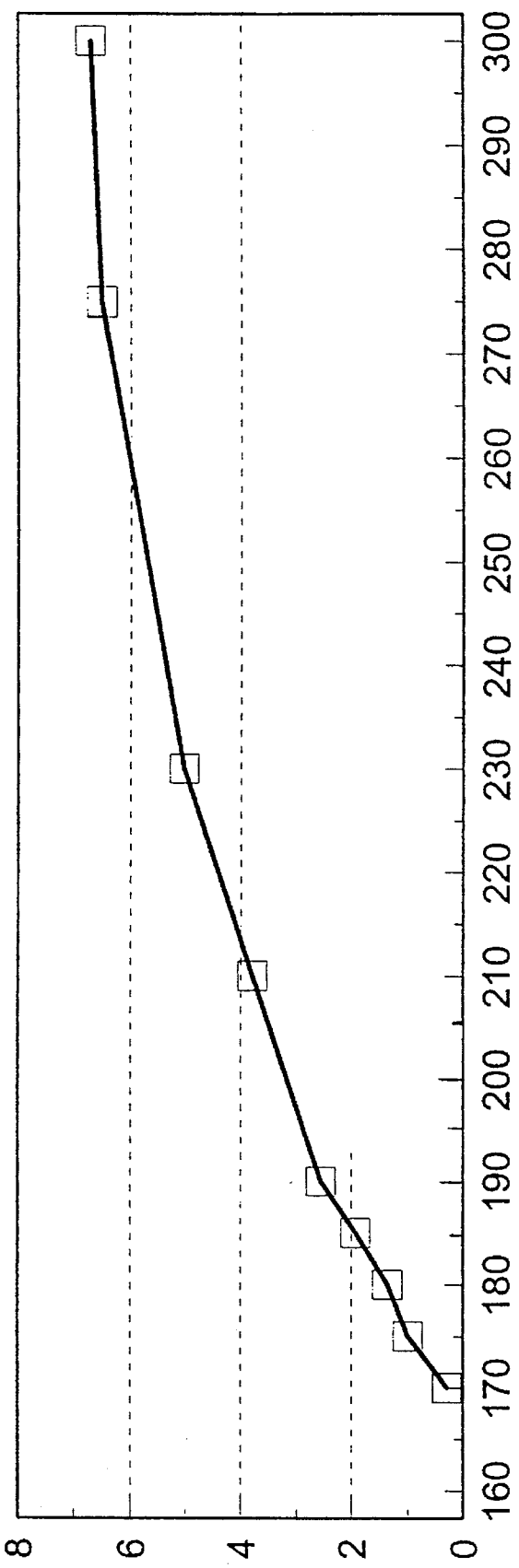

FIG. 4 shows the heat seal strength of the ionomer/polyethylene film of Example 22 as a function of temperature. The ordinate is temperature in °F. and the abscissa is the heat seal strength in lb/inch.

DETAILED DESCRIPTION OF THE INVENTION

A. Compositions

Compositions of this invention can be represented as the copolymerization product which contains the following comonomers:

(a) alpha-olefins having from 2 to 8 carbon atoms, (b) esters of alpha,beta-ethylenically-unsaturated carboxylic acids, (c) metal salts of acrylic or methacrylic acid, and (d) optionally, other alpha, beta-ethylenically-unsaturated comonomers which impart desirable polymer properties.

These compositions have no more than ten percent haze, preferably no more than seven percent haze, and more preferably, no more than five percent haze. The most preferred compositions have no more than two percent haze. Additionally, these compositions have very good hot tack strength, heat seal strength, and mechanical properties such as tensile strength. Acid functionality can also be introduced into these ionomers.

Examples of compositions of this invention include ethylene-methyl acrylate-sodium acrylate ionomer, ethylene-methyl methacrylate-sodium methacrylate ionomer, ethylene-ethyl acrylate-sodium acrylate ionomer, ethylene-propylene-methyl acrylate-sodium acrylate ionomer, ethylene-propylene-methyl methacrylate-sodium methacrylate ionomer, ethylene-methyl acrylate-lithium acrylate ionomer, ethylene-methyl acrylate-potassium acrylate ionomer, ethylene-methyl acrylate-cobalt(II) or (III) acrylate ionomer, ethylene-methyl acrylate-zinc acrylate ionomer, ethylene-methyl acrylate-titanium(II), (III), or (IV) acrylate ionomer, ethylene-methyl acrylate-magnesium acrylate ionomer, ehtylene-methyl acrylate-iron(II) or (III) acrylate ionomer, ethylene-methyl acrylate-nickel(II) or (III) acrylate ionomer, ethylene-methyl acrylate-copper(I) or (II) acrylate ionomer, ethylene-methyl acrylate-acrylic acid-sodium acrylate ionomer, ethylene-methyl methacrylate-methacrylic acid-sodium methacrylate ionomer, ethylene-methyl acrylate-sodium acrylate ionomer grafted with maleic anhydride, ethylene-methyl acrylate-maleic anhydride-sodium acrylate ionomer, and acrylic acid-grafted-(ethylene-methyl acrylate-sodium acrylate ) ionomer.

Monomer (a) comprises alpha-olefins having from 2 to 8 carbon atoms. Preferably, monomer (a) comprises alpha-olefins having from 2 to 3 carbon atoms, and more preferably, monomer (a) consists essentially of ethylene.

Monomer (b) comprises esters of alpha, beta-ethylenically-unsaturated carboxylic acids having from 4 to 22 carbon atoms. Preferably, monomer (b) has from 4 to 13 carbon atoms, and more preferably has from 4 to 8 carbon atoms. Examples of monomer (b) include methyl acrylate, methyl methacrylate, ethyl acrylate, ethyl methacrylate, butyl acrylate, and butyl methacrylate. Methyl acrylate is the preferred monomer (b).

Monomer (c) is a metal salt of acrylic or methacrylic acid. The metal ion is selected from Group IA, Group IIA, and transition metal ions. The metal ions may also be aluminum, gallium, germanium, and tin. Other examples include lithium, sodium, potassium, rubidium, cesium, calcium, magnesium, zinc, titanium, iron, cobalt, nickel, and copper. Preferably, the metal ion is a Group IA or Group IIA metal ion, and more preferably, the metal ion is a Group IA metal ion. Most preferred is sodium. Monomer (c) is about 25 to 99 mole percent of the total amount of (b) and (c) present in a composition. Preferably, monomer (c) is about 35 to 80, and more preferably, is about 40 to 60, mole percent of the total amount of (b) and (c) present in a composition.

Typically, a composition of this invention contains from about 1 to 20 mole percent of monomers (b) and (c) in total. Preferably, a composition contains about 3.5 to 12.5 mole percent, and more preferably, about 5.5 to 10 mole percent of monomers (b) and (c). Most preferred is a composition containing about 7.5 to 10 mole percent of monomers (b) and (c).

Monomer (d) is an alpha, beta-ethylenically-unsaturated comonomer which imparts certain desired polymer properties. The amount and type of monomer (d) is determined by the particular properties that are desired in the final composition. For example, monomer (d) may be acrylic or methacrylic acid which is present in an amount that provides the desired acid functionality to the composition. Other examples of monomer (d) include maleic anhydride and maleic acids to impart acidity, acrylonitrile to impart solvent resistance, and styrene to increase the rigidity of the composition. Typically, the compositions contain 0 to 10 mole percent of monomer (d). Preferred compositions contain 0 to 5 mole percent of monomer (d).

Monomer (d) can also be added by grafting a group such as acrylic acid or maleic anhydride to a composition of the present invention or to one of the composition's precursors. As a result, compositions can comprise grafted (ethylene, (meth)acrylate, metal salt of (meth)acrylic acid) copolymers. Maleic anhydride-grafted (ethylene, methyl acrylate, sodium acrylate) copolymer is one such composition.

The ionomer compositions of this invention have a number of surprising features which distinguish them from other ionomers having similar chemical constituents. The ionomers of this invention are quite clear. Haze is typically no more than 5 percent. Also, in one preferred embodiment, the 60° gloss is typically at least 100, and in many instances, is at least 120. In another preferred embodiment, tensile strength of the composition is improved over ionomers of similar composition by 100–300 percent. Hot-tack strength and heat seal strength can also be improved over ionomers of similar composition. Combinations of these improved features are present in some preferred compositions of this invention.

For example, the haze, gloss, and tensile strength of ionomer of this invention are substantially different from the haze, gloss, and tensile strength of ionomer made by the process of U.S. Pat. No. 5,218,057. Ethylene-methyl acrylate copolymer having about 20 weight percent (about 7.5 mole percent) methyl acrylate and having about 65% of the methyl acrylate saponified with aqueous sodium hydroxide according to the process of U.S. Pat. No. 5,218,057 had a haze of 15% and 60° gloss of 66. Tensile strength of an ethylene-methyl acrylate copolymer having 20 weight percent methyl acrylate which had about 60% of the methyl acrylate groups saponified with aqueous sodium hydroxide according to the process of U.S. Pat. No. 5,218,057 was 1582 psi in the machine direction. A composition of the present invention made by saponifying an ethylene-methyl acrylate copolymer having about 20 weight percent methyl acrylate with aqueous sodium hydroxide to convert about 65% of the methyl acrylate groups had a haze of 2%, gloss of 133, and tensile strength in the machine direction of 4010 psi.

The ionomers of this invention also can be formed into very thin film. When blowing film, the blow-up ratio can be as high as 2:1 to about 2.5:1. Typically, a film of ionomer of this invention can have a thickness of less than about 1 mil. Film having a thickness of about 0.5 mil has been made, and film having a thickness of about 0.2–0.3 mil can be made on conventional processing equipment.

The morphology of prior art ionomers can also differ substantially from the morphology of ionomers of this invention. Prior-art ionomers can contain highly localized and large clusters of ionic material dispersed throughout the ionomer. Scanning-electron micrographs have shown that these clusters can range in size from about 0.05 micron to greater than 1 micron in size.

FIG. 2 is a scanning-electron micrograph for the ionomer of Comparative Example G. This ionomer consists essentially of ethylene, 5.7 mole percent methyl acrylate, and 1.8 mole percent of the sodium salt of acrylic acid. The spherical or oblong ionic clusters evident in this micrograph range in size from about 0.1 micron to about 0.5 micron. The clusters were determined to be ionic by energy-dispersive X-ray spectroscopy, which showed a higher sodium content within the clusters when compared to the surrounding continuous phase.

FIG. 1 is a scanning-electron micrograph for ionomer composition of this invention, which consists essentially of ethylene, 3.7 mole percent methyl acrylate, and 3.7 mole percent of the sodium salt of acrylic acid. This ionomer composition is substantially free of ionic clusters of the size seen in FIG. 2, since essentially no ionic clusters are observed in this micrograph. An ionomer composition which is substantially free of ionic clusters contains essentially no ionic clusters about 0.05 micron in size or larger when a freeze-fractured cross-section of 3-mil thick blown film which is made by the method of Example 1 is viewed with a scanning electron microscope at a magnification factor of 8,000. An ionomer composition which is substantially free of ionic clusters will also have a haze of no more than ten percent. The ionomer composition of FIG. 1 corresponds to the composition of Example 12, which had a haze of 3%. The large flecks of debris in FIG. 1 are believed to be foreign matter. The flecks are not regions having high sodium content.

Additives well-known in the art may be included in the ionomer, such as anti-block and slip additives and antioxidants. Preferably, the composition of this invention also contains a polymeric acid having a molecular weight of less than about 10,000, such as ethylene acrylic acid. Ionomer compositions containing these low molecular weight acids are disclosed in copending U.S. Ser. No. 08/188,848, filed Jan. 31, 1994, which is incorporated by reference in its entirety herein.

B. Method for making the compositions

One method for making compositions of this invention comprises saponifying a copolymer having ester groups with a Group IA metal-containing solution. To obtain the clear ionomer compositions of this invention, it is important to provide intensive mixing of the copolymer and the Group IA metal-containing solution and to have a temperature and/or extent of saponification high enough that a substantially uniform saponification of the copolymer occurs. This method minimizes the production of localized ionomer regions or domains, which appear as the spherical and oblong ionic clusters of FIG. 2. This method also permits a greater extent of saponification of the copolymer without obtaining a saponified product that has so high of a viscosity that it cannot be formed into a film on conventional equipment.

Intensive mixing of the reaction components results from selection of reactants with the appropriate physical and chemical characteristics and selection of the proper processing conditions. Particular processing conditions are discussed below for a reactive extruder. However, the general principles disclosed therein apply to processes which are equivalent to saponifying a copolymer with a Group IA metal-containing solution in a reactive extruder.

(1) Reactants (a) Copolymer to be saponified

The copolymers which are saponified comprise copolymers of ethylene, esters of alpha, beta-ethylenically-unsaturated carboxylic acids, and optional alpha, beta-ethylenically-unsaturated comonomers which impart desirable polymer properties. Typically, these copolymers contain from about 1 to 20 mole percent of esters of alpha, beta-ethylenically-unsaturated carboxylic acids in total. Preferably, the copolymers contain about 2 to 20 mole percent, more preferably 3.5 to 12.5 mole percent, and even more preferably, about 5.5 to 12.5 mole percent of esters of alpha, beta-ethylenically-unsaturated carboxylic acids in total. Most preferred are those copolymers containing about 6.5 to 10 mole percent of esters of alpha, beta-ethylenically-unsaturated carboxylic acids. The preferred esters are alkyl acrylates. Preferably, the alkyl group contains from one to eight carbon atoms, and more preferably contains from one to four carbon atoms. Methyl is a preferred alkyl group.

Examples of the copolymers which are saponified include ethylene-methyl acrylate copolymer, ethylene-methyl methacrylate copolymer, ethylene-ethyl acrylate copolymer, ethylene-propylene-methyl acrylate copolymer, ethylene-propylene-methyl methacrylate copolymer, ethylene-methyl acrylate-acrylic acid copolymer, ethylene-methyl methacrylate-methacrylic acid copolymer, maleic anhydride-grafted-ethylene-methyl acrylate copolymer, ethylene-methyl acrylate-maleic anhydride copolymer, acrylic acid-grafted-ethylene-methyl acrylate copolymer, and ethylene-methyl acrylate-butyl acrylate copolymer. Preferably, the copolymers are ethylene-methyl acrylate copolymer, ethylene-methyl methacrylate copolymer, ethylene-ethyl acrylate copolymer, maleic anhydride-grafted-ethylene-methyl acrylate copolymer, and ethylene-methyl acrylate-butyl acrylate copolymer. Most preferred is ethylene-methyl acrylate copolymer.

The melt index of copolymers to be saponified should be between about 100 and 2000, preferably between about 200 and 800, and more preferably between about 300 and 600 grams/10 minutes. Copolymers having higher melt-index values are preferred when it is desired to have a saponified composition with a higher melt index. One process for making these copolymers comprises polymerizing ethylene, alkyl acrylate and/or alkyl methacrylate, and the optional comonomer in autoclaves using free-radical initiation catalysts. This process is described in U.S. Pat. No. 3,350,372, which is incorporated by reference in its entirety. The copolymers of the examples were made by this method, unless specified otherwise. In one preferred embodiment, the ethylene-alkyl acrylate copolymer is made by the process described in copending U.S. Ser. No. 07/947,870, filed Sep. 21, 1992 (published as WO 93/06137), which is incorporated by reference in its entirety herein. Copolymer made by this process has a substantially higher melt-point temperature than the copolymer made by the process of U.S. Pat. No. 3,350,372. The ionomer of this invention has high melt point temperature and high clarity when made with this copolymer. Another process for producing copolymers useful in making the ionomer compositions of this invention comprises free-radical polymerization of ethylene and alkyl acrylate and/or alkyl methacrylate as described above, followed by reactive extrusion with a compound such as acrylic acid or maleic anhydride. Alternatively, grafting may be performed after saponification. A particularly preferred copolymer is ethylene-methyl acrylate copolymer having between about 5.5 and 12.5 mole percent methyl acrylate and having a melt index of about 400 g/10 min., available from Chevron Chemical Company as EMAC® copolymer.

b) Group IA metal-containing solution

The Group IA metal-containing solution comprises a Group IA metal in a solvent, which solvent does not prevent saponification of an ester by the Group IA metal. The solvent is preferably one which evaporates readily under devolatilization conditions typically encountered in reactive extruders. Solvents can be organic or inorganic, and common solvents include water, alcohols, and polyethylene glycols, with water being preferred.

The Group IA metal-containing solution has at least one Group IA metal present. Preferably, the solution comprises an aqueous solution of a Group IA metal oxide and/or hydroxide, such as oxides and hydroxides of lithium, sodium, potassium, rubidium, and/or cesium. Preferably, the Group IA metal-containing solution comprises aqueous sodium hydroxide or aqueous potassium hydroxide.

It is important that the overall concentration of metals in the Group IA metal-containing solution is low enough that the solution is capable of being mixed uniformly and intensively with melted copolymer in a reaction section of a reactive extruder. However, it is preferred to have only that amount of solvent present that is necessary to provide this capability. Normally, a sufficient quantity of solvent is present when the Group IA metal-containing solution contains little or no excess solvent beyond that required to solubilize essentially all of the Group IA metal and other metals present. Thus, for example, 50% aqueous caustic solution is preferred over 35% aqueous caustic solution.

The Group IA metal-containing solution may optionally contain other metal oxides, hydroxides, and/or salts which supply cations for monomer (c). The metal ions can be alkaline earth or transition-element metals. Specific examples of these metals include calcium, magnesium, zinc, titanium, cobalt, nickel, and copper. Typical anions include hydroxide, halide, acetate, propionate, decanoate, and stearate ions, with acetate ions being preferred anions. The hydroxide form is also preferred.

Instead of being present in the Group IA metal-containing solution, metal ions (including Group IA metal ions) may optionally be incorporated into the ionomer composition of this invention by other methods. One method is to first saponify a copolymer by the method of this invention, then totally or partially replace the ion of this ionomer composition with other metal ions under ion-exchange conditions, or to react the ionomer composition with an aqueous metal hydroxide. For example, an ion-exchange solution comprising an aqueous solution of zinc oxide or zinc acetate may be mixed with a sodium ionomer composition of this invention in a section of a reactive extruder to replace at least a portion of the sodium ions with zinc ions.

Examples of metal ions which may be exchanged include the alkaline metals, alkaline earth metals such a magnesium, transition metals such as titanium, cobalt, copper, and zinc, and other metal ions such as aluminum, gallium, germanium, and tin.

The anion of a salt used to ion-exchange the ionomer is preferably one which is easily washed out of the ionomer and separated from it during filtration. Alternatively, the anion is preferably one which forms an easily-evolved compound or one which evolves or whose products of decomposition evolve at devolatilization conditions in a reactive extruder. Typical anions include chloride, acetate, propionate, decanoate, and stearate ions. Acetate ions are preferred.

(2) Reactive Extruder

A reactive extruder which is useful in producing compositions of this invention comprises an extruder having a copolymer feed section, one or more reaction sections, a subsequent devolatilization section, and an extrusion section. Typically, these sections are separately jacketed to allow for heating or cooling within each section. These sections can also be vented with one or more vent ports per section to allow the escape of volatile components, such as the solvent for the Group IA metal solution and byproducts of the saponification reaction, such as alcohols. Generally, the reactive extruder will also have optional means for introducing reactants into any reaction sections as well as means for mixing components in the reaction section(s) and means for conveying the components through the extruder. Typically, the means for mixing and conveying components to be reacted are screws.

Reactive extruders can have a single screw or multiple screws. Each screw typically has a central shaft with a key-way or spline upon which mixing elements are secured. The reactive extruder may have either co-rotating or counter-rotating screws.

Typically, copolymer to be reacted is fed to the screw through a loss-in-weight feeder, and the solid copolymer is melted in a feed section of the reactive extruder. In some embodiments, all reactants (i.e. copolymer and Group IA metal-containing solution) can be fed to the reactive extruder through a feed section. In a preferred embodiment, copolymer is introduced into the reactive extruder in a feed section, and the Group IA metal-containing solution is fed to one or more reaction sections. A devolatilization section is a convenient means for removing any solvent and byproducts of the saponification reaction from the saponified composition. Equivalent or additional means for removing volatile components can be used, however, such as drying the ionomer composition under reduced pressure in a falling-film evaporator.

One reactive extruder which was particularly effective in producing compositions of this invention is a Werner-Pfleiderer co-rotating and intermeshing twin-screw extruder. The reactive extruder had a feed section, a reaction section, a devolatilization section, and a pressurization or pumping section which pushed the product through an extrusion die. The devolatilization section had a first portion which was vented to a condenser maintained at atmospheric pressure, and a second portion of the devolatilization section was vented with sufficient vacuum and capacity to remove essentially all of the volatile components from compositions prior to conveying and extruding them.

Typically, copolymer pellets are introduced into a feed section of a reactive extruder, where the pellets are heated and worked by the screw to form molten or fluid copolymer. The screw elements also convey the molten copolymer from this feed section to a first reaction section, where the molten copolymer and Group IA metal-containing solution are mixed intensively.

Intensive mixing can be supplied by incorporating one or more reverse-flow elements along with neutral or reverse-flow kneading blocks on the screw in a reaction zone. The copolymer to be saponified and the Group IA metal-containing solution should be mixed as uniformly and as quickly as possible to provide a fairly uniform reaction of metal-containing solution with the molten copolymer. Mixing should be of sufficient intensity that saponification of only localized areas is prevented.

This intensive mixing is of greater intensity than that required in the prior-art processes of U.S. Pat. No. 4,638,034 and U.S. Pat. No. 4,042,766. For example, a Werner-Pfleiderer Model ZSK-40 twin-screw reactive extruder had the configuration of screw elements detailed in Table 1 column A. This screw design provided intensive mixing of the Group IA metal-containing solution with copolymer in the reaction section through a combination of left-handed elements and neutral kneading blocks. It is believed that the left-handed elements in the reaction section provide momentary retardation of polymer flow in addition to a shear zone due to impeded and/or reversed flow of the reaction mass, while the neutral kneading blocks imparted intensive mixing and promoted additional shear. Most of the compositions of this invention were produced at a screw speed of about 400 to 550 rpm. High screw speeds help to assure intensive mixing.

TABLE 1

| ELEMENT NUMBER | COLUMN A | COLUMN B | COLUMN C |
|---|---|---|---|
| 1 | 40/20[1] | PKR/10[2] | PKR/10 |
| 2 | 60/60 | 20/10 | 20/10 |
| 3 | 60/60 | 42/42 | 42/42 |
| 4 | 40/40 | 42/42 | 42/42 |
| 5 | 40/40 | 42/42 | 28/28 |
| 6 | 40/40 | 28/28 | 28/28 |
| 7 | 40/20 | 28/28 | 28/28 |
| 8 | 40/40 | 20/20 | 20/20 |
| 9 | 25/25 | 20/20 | 20/20 |
| 10 | KB45/5/40[3] | 20/20 | 20/20 |
| 11 | KB45/5/40 | KB45/5/28 | 20/10 |
| 12 | 25/25 | KB45/5/28 | KB45/5/28 |
| 13 | 25/25 | 20/20 | KB45/5/28 |
| 14 | 25/25 | 20/20 | 20/20 |
| 15 | 40/20 LH[4] | KB90/5/28 | 20/20 |
| 16 | 25/25 | 20/10 LH | 20/10 LH |
| 17 | KB90/5/40 | 20/20 | 20/10 LH |
| 18 | 25/25 | 20/20 | 20/10 LH |
| 19 | KB90/5/40 | KB45/5/28 | 20/20 |
| 20 | 25/25 | 20/10 | 20/20 |
| 21 | 40/20 LH | 20/20 | KB45/5/28 |
| 22 | 25/25 | 20/20 | 20/10 |
| 23 | KB90/5/40 | KB90/5/28 | 20/20 |
| 24 | 25/25 | 20/20 | 20/20 |
| 25 | KB90/5/40 | KB45/5/14 LH | KB90/5/28 |
| 26 | 25/25 | KB45/5/14 LH | 20/20 |
| 27 | 40/20 LH | 20/20 | KB45/5/14 LH |
| 28 | KB45/5/20 LH | 20/20 | KB45/5/14 LH |
| 29 | 25/25 | KB90/5/28 | 20/20 |
| 30 | 25/25 | 20/20 | 20/20 |
| 31 | 25/25 | 20/20 | KB90/5/28 |
| 32 | 25/25 | 20/20 | 20/20 |
| 33 | 25/25 | 20/20 | 20/20 |
| 34 | 40/40 | 20/20 | 20/20 |
| 35 | 40/40 | KB90/5/28 | 20/20 |
| 36 | 40/40 | 20/20 | KB90/5/28 |
| 37 | KB45/5/20 LH | 20/20 | 20/20 |
| 38 | 40/40 | 20/20 | 20/20 |
| 39 | 40/40 | 20/20 | 20/20 |
| 40 | 40/40 | 20/20 | 20/20 |
| 41 | 40/40 | 20/20 | KB90/5/28 |
| 42 | 25/25 | 20/20 | 20/20 |
| 43 | 25/25 | 20/20 | 20/20 |
| 44 | 25/25 | KB90/5/28 | 20/10 |
| 45 | 25/25 | 20/20 | 20/20 |
| 46 | 25/25 | 20/20 | 20/20 |
| 47 | 25/25 | 20/10 LH | 20/20 |
| 48 | 25/25 | 20/10 LH | 20/20 |
| 49 | 25/25 | 20/20 | 20/20 |
| 50 | 25/25 | 20/20 | 20/20 |
| 51 | 25/25 | 20/20 | 20/20 |
| 52 | 25/25 | 20/20 | 20/20 |
| 53 | 25/25 | 42/42 | 20/20 |
| 54 | 25/25 | 42/42 | 20/20 |
| 55 | 25/25 | 42/42 | 42/42 |
| 56 | | 20/20 | 42/42 |
| 57 | | 20/20 | 42/42 |
| 58 | | 20/20 | 28/28 |
| 59 | | 20/20 | 20/20 |
| 60 | | 20/20 | 20/20 |
| 61 | | | 20/20 |

NOTES:
[1] All elements were right-handed elements unless designated otherwise. The first number is the pitch, given in distance (mm) traveled in one revolution. The second number is the length of the element (mm).
[2] The PKR element is a wedge-shaped adapter which provides a taper from the ½ inch shaft to the first element of the screw.
[3] KB indicates a kneading block. The first number is the angle formed by the paddles on the kneading block when compared to the line through the screw shaft, in degrees. The second number is how many paddles are on one element. The third number is the length of the element (mm).
[4] "LH" indicates a left-handed element.

(3) Reaction conditions

Reaction temperature, feed-rate of reactants, and extent of saponification are also important processing parameters when making compositions of this invention.

(a) Reaction temperature

Compositions of this invention are typically produced where the barrel temperature in the reaction section(s) of the extruder is between about 200° and 350° C., although some clear ionomers were prepared at a temperature between about 150° and 200° C. Any reaction temperatures discussed herein refer to the barrel temperatures of the extruder. The actual temperature of the melted polymer is believed to be lower than the measured barrel temperature because of heat-transfer limitations.

Preferably, the reaction temperature is between 225° and 350° C., and, more preferably, the temperature is between about 275° and 350° C. The upper limit of the temperature range is determined by the temperature at which the copolymer or composition degrades. The lower limit of the temperature range is the temperature at which 1) the copolymer to be reacted is in a molten or fluid state; 2) essentially all of the Group IA metal in the Group IA metal-containing solution is consumed by the saponification reaction within the reaction section; and 3) the composition being extruded remains visually clear. As a general rule, higher reaction temperatures as specified in the more preferable range above provide low-haze ionomers more consistently than lower reaction temperatures.

(b) Feed rate of reactants

The Group IA metal-containing solution is fed in an amount that is effective to achieve the desired extent of saponification of the copolymer being fed to the reactive extruder. Typically, essentially all of the Group IA metal in solution reacts with the copolymer. The Group IA metal-containing solution may be fed to a reaction section batch-wise or continuously, or it may be fed intermittently so that the solution is mixed intimately and rapidly with the molten copolymer. A continuous feed is preferred. The Group IA metal-containing solution may also be split between multiple reaction sections and be fed continuously and/or intermittently to any reaction section.

The copolymer to be saponified is fed to the reactive extruder at a rate high enough that the molten polymer forms a molten polymer seal between consecutive segments of a reaction section and between a reaction section and a devolatilization section. This seal can be formed by having a reverse-flow screw element at the desired seal location. The feed-rate should also be low enough that the reaction mass comprising the copolymer to be saponified and the Group IA metal-containing solution does not move through the reaction section so quickly that the reaction mass is not mixed intensively. The feed-rate should also be low enough that the extruded polymer is visually clear, corresponding to no more than ten percent haze.

The copolymer to be saponified may be fed to the extruder batch-wise, intermittently or continuously. A continuous feed is preferred to provide a commercially-attractive process which is easily and effectively controlled.

Typically, the average residence time for reactants in a Werner & Pfleiderer ZSK-40 twin-screw extruder which has a feed section, one reaction section, devolatilization section, and pumping section is about 30 to about 40 seconds at a continuous feed-rate of approximately 100 lb./hr. of polymer to be saponified and at a screw speed of about 500 rpm. The average residence time in the reaction section of this reactive extruder at these conditions is typically about 5 to about 15 seconds.

When the feed-rate is too high to make a composition of this invention, the screw torque will decrease, and the ionomer will turn cloudy. Both of these conditions can be observed almost immediately upon feeding too much copolymer to the extruder. Visually, the extruded copolymer turns from clear to cloudy, and when a strand of the cooled copolymer is pulled in the direction in which it was extruded, the cloudy copolymer turns whitish and opaque.

(c) % saponified

The extent of saponification is defined as the percent of moles of esters of alpha, beta-ethylenically-unsaturated carboxylic acids converted to metal salts of acrylic and methacrylic acid. Compositions of this invention have been produced where the extent of saponification of the ester groups in the copolymer has been between about 25 and 99%. Ionomer which has an extent of saponification below about 25% above are typically cloudy and have poorer gloss, melt strength, and/or tensile strength than compositions of this invention. A greater extent of saponification generally produces low-haze ionomers more consistently than a low extent of saponification, particularly when the reaction temperature is between about 150° and 225° C.

C. Acidification

Acidification of a polymer is a useful method for modifying polymer properties. In one preferred embodiment, ionomers of this invention have essentially no acidity. These ionomers can be represented as copolymers comprising comonomers of alpha-olefins, esters of alpha, beta-ethylenically-unsaturated carboxylic acids, and metal salts of alpha, beta-ethylenically-unsaturated carboxylic acids. The properties of these non-acidic ionomers can be modified by adding acid groups.

Also, some of the ionomers of this invention are highly water-dispersible. This can be an advantage for applications where repulpable compositions are desired, such as repulpable paper coatings and adhesives. However, water dispersibility is a problem where the ionomer composition is cooled in a water-bath after saponification, which is a common commercial method of cooling polymers. Much of the ionomer to be cooled can end up dispersed in the cooling water, turning the water a milky white color.

Other cooling means may be used for handling highly water-dispersible ionomers, such as hot-face cutting or utilizing an air-cooled conveyor or a conveyor which has a water-chilled surface to cool the polymer strands or pellets. However, these methods are more expensive and less efficient than passing hot polymer in the form of strands, pellets, or film through a water bath, and these methods require the installation of new equipment in many existing commercial ionomer production facilities. In addition, ionomer may discolor when using these cooling means, since the ionomer rapidly oxidizes when it is maintained at elevated temperatures for the extended periods of time inherent in these other cooling means.

(1) Cooling ionomer in an aqueous acid bath

In a preferred embodiment, highly water-dispersible ionomer of this invention may be cooled in an acid bath to prevent dispersion of much of the ionomer. Highly water-dispersible ionomer typically has a high sodium acrylate content which makes the ionomer water-soluble. It is believed that ion exchange occurs predominantly on the surface of the polymer when passing hot ionomer strands through the acid bath, replacing metal ions on the surface of the polymer with hydrogen ions from the acid. It is believed that this makes the surface of the strands or pellets acidic and substantially reduces their water solubility.

Infrared analysis of ionomer pellets which were cooled in an acid bath detected no acid groups. However, it is believed that the concentration of acid groups in the overall ionomer pellets was so small that it was undetectable by infrared analysis of the bulk ionomer.

Almost any inorganic or water-soluble organic acid can be used in the acid bath. A dilute aqueous solution of a non-oxidizing acid is preferred to reduce processing cost and to improve the washing efficiency when rinsing any excess acid off of the polymer. The following list is illustrative of the types of acids which may be used: sulfuric acid, formic acid, propionic acid, oxalic acid, and the like. Preferred acids are hydrochloric acid, phosphoric acid, and acetic acid.

The temperature of the acid solution is preferably that temperature which produces ionomer which has not discolored and which provides ionomer at the appropriate temperature for any subsequent processing steps, such as drying. The temperature of the acid solution is typically between about 5° to 50° C., and preferably is between about 10° and 30° C.

Example 16 illustrates this method for cooling ionomer using an aqueous acid solution.

(2) Acidification of a clear copolymer of ethylene and esters and metal salts of alpha, beta-ethylenically-unsaturated carboxylic acids In one embodiment, compositions of this invention have carboxylic acid groups, in which case the compositions can be represented as copolymers comprising comonomers of alpha-olefins, esters of alpha, beta-ethylenically-unsaturated carboxylic acids, metal salts of alpha, beta-ethylenically-unsaturated carboxylic acids, and alpha, beta-ethylenically-unsaturated carboxylic acids. Acid groups can plasticize the composition and increase its melt index. This permits tailoring of polymer properties such as polymer flow viscosity, tear strength, polymer reactivity with food, and odor or taste for a particular application.

Acidification of a composition comprising a copolymer of alpha-olefins, esters of alpha, beta-ethylenically-unsaturated carboxylic acids, and metal salts of alpha, beta-ethylenically-unsaturated carboxylic acids can occur in a reaction section of a reactive extruder. Preferably, acidification occurs in a second reaction section when using reactive extrusion, and preferably after the composition comprising the reaction product of a copolymer of alpha-olefins and esters of alpha, beta-ethylenically-unsaturated carboxylic acids has been saponified with a Group IA metal-containing solution in a first reaction section.

Other equipment may be used in place of a reactive extruder for acidification of a saponified composition. For example, a Brabender Plasticorder, a resin kettle, or an autoclave may be used.

A non-oxidizing acid can be used at a temperature and in a concentration which does not cause significant degradation of the copolymer or composition. Typically, the amount of acid required is the amount which provides the desired weight percent of acid groups per combined weight of acid and copolymer to be acidified. Examples of these acids include phosphoric acid, hydrochloric acid, benzoic acid, lactic acid, and stearic acid. Polymeric non-oxidizing acids can also be used, such as ethylene-acrylic acid copolymer, exemplified by Dow Chemical Company's Primacor Grade 3330. The non-oxidizing acids may have only one or two monomer units, such as benzoic acid or acetic acid, or they may comprise polymeric acids having multiple monomer units and having a molecular weight well in excess of one million, such as Primacor Grade 3330. Phosphoric acid, lactic acid, and polymer acids are preferred. Typical temperatures for acidification are between about 190° and 300° C., and preferably are between about 230° and 300° C. The acid concentration is preferably between 10 and 95%.

In certain applications or compositions of this invention, any byproducts of acidification can remain in the composition. For other applications or compositions, any byproducts of acidification and/or any excess acid can be removed from the ionomer by washing with water or other solvent and filtering the composition. For example, polymer acidified using phosphoric acid can be washed with water in an autoclave. The byproduct salt in the aqueous phase can subsequently be separated from the polymer by filtration.

D. Uses of the compositions

Ionomer compositions of this invention can be formed into single or multi-layer films using conventional equipment. For example, cast, extruded, or blown film can be made.

An ionomer composition of this invention can be coextruded with or laminated to other polymers such as nylon (unoriented and oriented), polyester (unoriented and oriented), polystyrene, vinyl acetate, polyacrylonitrile, polyvinylidene dichloride, and polyolefins such as polypropylene (unoriented and oriented), polyethylene (low density, high density, and linear low density), ethylene-methyl (meth)acrylate copolymers, ethylene-ethyl (meth)acrylate copolymers, ethylene-(meth)acrylic acid copolymers, ethylene-vinyl alcohol copolymers, ethylene vinyl acetate copolymers, and other polymers and their derivatives capable of being coextruded. Typical uses for ionomer compositions of this invention include their use in single-layer or multi-layer films, where they can be used as tie layers or used for imparting flexibility, strength, hot tack, and/or heat seal capabilities. Such uses include stretch films, bundling (shrink) wrap, food and drug packaging, and skin packaging for protecting the contents of a package.

Single-layer ionomer film or multi-layer film in which the ionomer is on one face of the film can be used as a surface protection layer for products such as glass, polycarbonate or poly(methyl methacrylate) products, which can be used in windshields for vehicles or windows. The ionomer layer protects products from scratches and/or nicks because of the ionomer's abrasion resistance. The ionomer's adhesion to such substrates is excellent, yet it can be peeled readily from the surface. The transparency of the ionomer of this invention allows visual inspection of the surface of the wrapped product, permitting a customer to inspect a product for flaws prior to receipt and unwrapping of the product.

Single-layer ionomer film or multi-layer film containing ionomer of this invention can be used to make easy-open packaging such as easy-tear film, bags, pouches and parcels. A tear propagates linearly through the film, and the Elmendorf tear strength of the ionomer indicates that it is well-suited to uses such as easy-opening packaging. The package in which the film is incorporated normally is notched or incorporates a tear strip to facilitate ease of opening of the package.

The ionomer of this invention can also serve as its own tie layer due to its good adhesion to other layers. This eliminates the need for separate tie layers in a multi-layer film, reducing the thickness of the multi-layer film and reducing the overall cost of making the multi-layer film.

Ionomer compositions of this invention may also be used in thermally extruded and thermally formed products such as automotive interior parts and skin packaging. The ionomer compositions may be used alone or in combination with other polymers in blow-molded or injection molded articles, particular where such articles need to be grease- and oil-resistant such as bottles for fragrances or detergents, and the compositions may also be used in articles such as food trays formed by vacuum thermo-forming. The ionomer compositions of this invention may be used in making articles such as golf ball covers; coated fabrics; orthopedic, prosthetic and medical devices; recreational equipment; and footwear components. The ionomer compositions of this invention are especially useful in applications where the ionomer properties discussed above, as well as the excellent abrasion resistance, transparency, and/or directional tear properties of the ionomer, are useful.

Theories discussed herein are intended to provide possible explanations for what was observed. These theories are not to be interpreted as limiting the invention described herein. Also, the following examples are illustrative and are not intended to limit the invention disclosed herein.

EXAMPLE 1

An ethylene-methyl acrylate copolymer (manufactured by Chevron by the method disclosed in U.S. Pat. No. 3,350,372) containing 20% by weight methyl acrylate (7.5 mole %) and having a melt index of 400 g/10 min. (190° C.) was fed to a Werner & Pfleiderer corrosion-resistant ZSK-40 mm twin screw extruder at a rate of 100 lbs./hr. The extruder had a ratio of length to diameter of about 44. The screw configuration for Examples 1–13 and Comparative Example A is given in Table 1 column A. Aqueous sodium hydroxide (50% NaOH by weight in all examples, except where noted otherwise) was fed to Zone 3 of the extruder at 9.3 lbs./hr. The screw speed was 550 rpm.

The following extruder temperatures were measured:

TABLE 2

| Zone No. | 1 | 2 | 3 | 4 | 5 | 6 | 7 |
|---|---|---|---|---|---|---|---|
| Temperature (°C.) | 236 | 350 | 253 | 253 | 230 | 245 | 260 |

Note:
Zone 1: melting section for polymer to be reacted;
Zone 2 & 3: reaction section;
Zone 4: devolatilization section;
Zones 5–7: extrusion section.

Water from the sodium hydroxide solution and the reaction by-product methanol were removed by a two-stage devolatilization. In all examples, the evolved water and methanol from the first devolatilization stage were condensed at atmospheric pressure. The second devolatilization stage was connected to a vacuum system in all examples. The second devolatilization stage had 28.4 in. Hg vacuum during this run.

The reaction product was extruded through an eight-strand die, cooled on a stainless steel belt (about 20 feet in length, made by Sandvik) which was chilled by cold water underneath the belt, and subsequently pelletized.

The product had a melt flow rate of 0.33 g/10 min. (230° C.). The product had a hydrolysis of 53% (i.e., 53% of the methyl acrylate in the ethylene-methyl acrylate copolymer was converted to sodium acrylate).

The polymer was made into blown film on a Victor blown film line at the following processing conditions:

TABLE 3

| Zone 1 | Zone 2 | Zone 3 | Adapter | Die 1 | Die 2 | Die Pressure | Melt Temperature |
|---|---|---|---|---|---|---|---|
| 400° F. | 440° F. | 515° F. | 435° F. | 430° F. | 440° F. | 7600 psi | 440° F. |

The blown film had a thickness of 3.5 mils. The haze of the film was 2%, and the 60° gloss was 122. The 1% secant moduli of the film were 12,740 and 10,080 psi respectively for the machine direction (MD) and the transverse direction (TD).

All haze values were measured using the method of ASTM D 1003. The 60° gloss values were measured using the method of ASTM D 2457. The 1% secant modulus values and tensile strength values were measured using the method of ASTM D-638.

Melt index of feed resin was measured by the method of ASTM D 1239, using a temperature of 190° C. and a 2.16 kg weight. The melt flow rate of a composition of this invention was determined by the method of ASTM D 1239 but using a temperature of 230° C. rather than 190° C. and using a 2.16 kg weight.

The hydrolysis of the product is defined as the moles of metal salt of the alpha, beta-ethylenically-unsaturated carboxylic acid present in the product, expressed as a percentage of the moles of the ester of alpha, beta-ethylenically-unsaturated carboxylic acid present prior to saponifying the copolymer The terms "hydrolysis", "extent of hydrolysis", "percent hydrolysis", "percent saponified", and "extent of saponification" are used interchangeably.

The extent of hydrolysis is determined by dissolving 10 g. of ionomer in 250 ml. of tetrahydrofuran (THF) in a 500 ml. round-bottom flask, to which 1 ml. of glacial acetic acid is added. The flask is fitted with a refluxing condenser, and the contents are boiled for about 20 min. The mixture is poured into 1 liter of cold distilled water (about 15°–20° C.), and then filtered. The precipitate is subsequently washed with about 3 liters of distilled water. The precipitate is dried under vacuum, then weighed and dissolved in THF and titrated with 0.1N potassium hydroxide in ethanol, using thymol blue to indicate the end-point of titration. The extent of hydrolysis is then calculated by dividing the moles of potassium used in titrating the sample by the moles of ester present in the initial ethylene-methyl acrylate copolymer prior to the saponification reaction.

EXAMPLE 2

The ethylene-methyl acrylate copolymer of Example 1 was fed to the Werner & Pfleiderer corrosion-resistant ZSK-40mm twin screw extruder at a rate of 100 lbs./hr. Aqueous sodium hydroxide was fed to Zone 3 of the extruder at a rate of 11.2 lbs./hr. The screw speed was 500 rpm.

The following temperatures were measured during the process:

TABLE 4

| Zone No. | 1 | 2 | 3 | 4 | 5 | 6 | 7 |
|---|---|---|---|---|---|---|---|
| Temperature (°C.) | 271 | 252 | 255 | 256 | 230 | 231 | 241 |

The vacuum on the second devolatilization zone was 28.4 in. Hg. The reaction product was extruded, cooled on a Sandvik belt and pelletized in the same way as Example 1. The product had a melt flow rate of 0.20 g/10 min. (230° C.). The hydrolysis of the product was 65%. The polymer was made into blown film on a Victor blown film line using the processing conditions similar to those in Example 1. The haze of the blown film was 2%, and the 60° gloss was 133. The film had a tensile strength of 4010 and 3180 psi respectively for MD and TD. The 1% secant moduli of the film were 14720 and 13110 psi respectively for MD and TD.

EXAMPLE 3

The ethylene-methyl acrylate copolymer of Example 1 was fed to the Werner & Pfleiderer corrosion-resistant ZSK-40mm twin screw extruder at a rate of 100 lbs./hr. Aqueous sodium hydroxide was fed to Zone 3 on the extruder at a rate of 12.1 lbs./hr. The screw speed was 500 rpm.

The following temperatures were measured during the process:

TABLE 5

| Zone No. | 1 | 2 | 3 | 4 | 5 | 6 | 7 |
|---|---|---|---|---|---|---|---|
| Temperature (°C) | 218 | 347 | 255 | 255 | 230 | 251 | 260 |

The vacuum on the second devolatilization zone was 28.5 in. Hg. The reaction product was extruded, cooled on a Sandvik belt and pelletized in the same way as Example 1. The product had a melt flow rate of 0.1 g/10 min. (230° C.). The hydrolysis of the product was 70%.

The polymer was made into blown film on a Victor blown film line using the processing conditions similar to those in Example 1. The haze of the blown film was 2%, and the 60° gloss was 134. The film had a tensile strength of 4470 and 2420 psi respectively for MD and TD.

EXAMPLE 4

An ethylene-methyl acrylate copolymer containing 20% by weight methyl acrylate and having a melt index of 570 g/10 min. (190° C.) was fed to the Werner & Pfleiderer corrosion-resistant ZSK-40mm twin screw extruder at a rate of 100 lbs./hr. Aqueous sodium hydroxide was fed to Zone 3 on the extruder at a rate of 13.0 lbs./hr. The screw speed was 500 rpm.

The following temperatures were measured during the process:

TABLE 6

| Zone No. | 1 | 2 | 3 | 4 | 5 | 6 | 7 |
|---|---|---|---|---|---|---|---|
| Temperature (°C.) | 178 | 242 | 254 | 252 | 301 | 303 | 289 |

The vacuum on the second devolatilization zone was 25.5 in. Hg. The reaction product was extruded, cooled on a Sandvik belt and pelletized in the same way as Example 1. The product had a melt flow rate of 0.87 g/10 min. (230° C.). The hydrolysis of the product was 69%.

The polymer was made into blown film on a Victor blown film line using the processing conditions similar to those in Example 1. The haze of the blown film was 2% and the 60° gloss (ASTM D 2457) was 135. The film had a tensile strength of 2870 and 1760 psi respectively for MD and TD.

EXAMPLE 5

An ethylene-methyl acrylate copolymer containing 20% by weight methyl acrylate and having a melt index of 440 g/10 min. (190° C.) was fed to the Werner & Pfleiderer corrosion-resistant ZSK-40mm twin screw extruder at a rate of 100 lbs./hr. Aqueous sodium hydroxide was fed to Zone 3 on the extruder at a rate of 13.0 lbs./hr. The screw speed was 500 rpm.

The following temperatures were measured during the process:

TABLE 7

| Zone No. | 1 | 2 | 3 | 4 | 5 | 6 | 7 |
|---|---|---|---|---|---|---|---|
| Temperature (°C.) | 189 | 257 | 257 | 258 | 251 | 263 | 283 |

The vacuum on the second devolatilization zone was 28.4 in. Hg. The reaction product was extruded, cooled on a Sandvik belt and pelletized in the same way as Example 1. The product had a melt flow rate of 0.81 g/10 min. (230° C.). The hydrolysis of the product was 72%.

The polymer was made into blown film on a Victor blown film line using the processing conditions similar to those in Example 1. The haze of the blown film was 2%, and the 60° gloss was 135. The film had a tensile strength of 2600 and 1850 psi respectively for MD and TD.

EXAMPLE 6

An ethylene-methyl acrylate copolymer containing 23% by weight methyl acrylate and having a melt index of 500 g/10 min. (190° C.) was fed to the Werner & Pfleiderer corrosion-resistant ZSK-40mm twin screw extruder at a rate of 100 lbs./hr. Aqueous sodium hydroxide was fed to Zone 3 on the extruder at a rate of 10.7 lbs./hr. The screw speed was 500 rpm.

The following temperatures were measured during the process:

TABLE 8

| Zone No. | 1 | 2 | 3 | 4 | 5 | 6 | 7 |
|---|---|---|---|---|---|---|---|
| Temperature (°C.) | 181 | 247 | 256 | 255 | 255 | 254 | 270 |

The vacuum on the second devolatilization zone was 26.7 in. Hg. The reaction product was extruded, cooled on a Sandvik belt and pelletized in the same way as Example 1. The product had a melt flow rate of 0.54 g/10 min. (230° C.). The hydrolysis of the product was 51%.

The polymer was made into blown film on a Victor blown film line using the processing conditions similar to those in Example 1 The haze of the blown film was 2% and the 60° gloss was 124. The film had a tensile strength of 2270 and 1470 psi respectively for MD and TD.

EXAMPLE 7

An ethylene-methyl acrylate copolymer containing 23% by weight methyl acrylate and having a melt index of 500 g/10 min. (190° C.) was fed to the Werner & Pfleiderer corrosion-resistant ZSK-40mm twin screw extruder at a rate of 100 lbs./hr. Aqueous sodium hydroxide was fed to Zone 3 on the extruder at a rate of 12.8 lbs./hr. The screw speed was 500 rpm.

The following temperatures were measured during the process:

TABLE 9

| Zone No. | 1 | 2 | 3 | 4 | 5 | 6 | 7 |
|---|---|---|---|---|---|---|---|
| Temperature (°C.) | 175 | 247 | 253 | 259 | 254 | 257 | 271 |

The vacuum on the second devolatilization zone was 26.6 in. Hg. The reaction product was extruded, cooled on a Sandvik belt and pelletized in the same way as Example 1. The product had a melt flow rate of 0.45 g/10 min. (230° C.). The hydrolysis of the product was 61%.

The polymer was made into blown film on a Victor blown film line using the processing conditions similar to those in Example 1. The haze of the blown film was 3%, and the 60° gloss was 132. The film had a tensile strength of 2730 and 1960 psi respectively for MD and TD.

EXAMPLE 8

An ethylene-methyl acrylate copolymer containing 23% by weight methyl acrylate and having a melt index of 500 g/10 min. (190° C.) was fed to the Werner & Pfleiderer corrosion-resistant ZSK-40mm twin screw extruder at a rate of 100 lbs./hr. Aqueous sodium hydroxide was fed to Zone 3 on the extruder at a rate of 9.6 lbs./hr. The screw speed was 500 rpm.

The following temperatures were measured during the process:

TABLE 10

| Zone No. | 1 | 2 | 3 | 4 | 5 | 6 | 7 |
|---|---|---|---|---|---|---|---|
| Temperature (°C.) | 193 | 284 | 257 | 259 | 254 | 254 | 271 |

The vacuum on the second devolatilization zone was 26.2 in. Hg. The reaction product was extruded, cooled on a Sandvik belt and pelletized in the same way as Example 1. The product had a melt flow rate of 0.60 g/10 min. (230° C.). The hydrolysis of the product was 46%.

The polymer was made into blown film on a Victor blown film line using the processing conditions similar to those in Example 1. The haze of the blown film was 2%, and the 60° gloss was 120. The film had a tensile strength of 1950 and 1240 psi respectively for MD and TD.

EXAMPLE 9

An ethylene-methyl acrylate copolymer containing 22% by weight methyl acrylate and having a melt index of 470 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 14.3 lbs./hr. The screw speed was 500 rpm.

The following temperatures were measured during the process:

TABLE 11

| Zone No. | 1 | 2 | 3 | 4 | 5 | 6 | 7 |
|---|---|---|---|---|---|---|---|
| Temperature (°C.) | 298 | 326 | 255 | 266 | 254 | 254 | 271 |

The vacuum on the second devolatilization zone was 28.4 in. Hg. The reaction product was extruded, cooled on a Sandvik belt and pelletized in the same way as Example 1. The product had a melt flow rate of 0.23 g/10 min. (230° C.). The hydrolysis of the product was 70%.

The polymer was made into blown film on a Victor blown film line using the processing conditions similar to those in Example 1. The haze of the blown film was 1%, and the 60° gloss was 134. The film had a tensile strength of 3000 and 2170 psi respectively for MD and TD.

EXAMPLE 10

An ethylene-methyl acrylate copolymer containing 23% by weight methyl acrylate and having a melt index of 500 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 8.6 lbs./hr. The screw speed was 500 rpm.

The following temperatures were measured during the process:

TABLE 12

| Zone No. | 1 | 2 | 3 | 4 | 5 | 6 | 7 |
|---|---|---|---|---|---|---|---|
| Temperature (°C.) | 177 | 262 | 255 | 253 | 254 | 255 | 270 |

The vacuum on the second devolatilization zone was 25.8 in. Hg. The reaction product was extruded, cooled on a Sandvik belt and pelletized in the same way as Example 1. The product had a melt flow rate of 1.25 g/10 min. (230° C.). The hydrolysis of the product was 41%.

The polymer was made into blown film on a Victor blown film line using the processing conditions similar to those in Example 1. The haze of the blown film was 4%, and the 60° gloss was 104. The film had a tensile strength of 1910 and 970 psi respectively for MD and TD.

EXAMPLE 11

An ethylene-methyl acrylate copolymer containing 20% by weight methyl acrylate and having a melt index of 100 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 4.7 lbs./hr. The screw speed was 500 rpm.

The following temperatures were measured during the process:

TABLE 13

| Zone No. | 1 | 2 | 3 | 4 | 5 | 6 | 7 |
|---|---|---|---|---|---|---|---|
| Temperature (°C.) | 253 | 322 | 254 | 230 | 230 | 231 | 241 |

The vacuum on the second devolatilization zone was 28.4 in. Hg. The reaction product was extruded, cooled on a Sandvik belt and pelletized in the same way as Example 1. The product had a melt flow rate of 0.67 g/10 min. (230° C.). The hydrolysis of the product was 26%.

The polymer was made into blown film on a Victor blown film line using the processing conditions similar to those in Example 1. The haze of the blown film was 3%, and the 60° gloss was 115. The film had a tensile strength of 1150 and 1080 psi respectively for MD and TD.

EXAMPLE 12

An ethylene-methyl acrylate copolymer containing 20% by weight methyl acrylate and having a melt index of 400 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 9.3 lbs./hr. The screw speed was 500 rpm.

The following temperatures were measured during the process:

TABLE 14

| Zone No. | 1 | 2 | 3 | 4 | 5 | 6 | 7 |
| --- | --- | --- | --- | --- | --- | --- | --- |
| Temperature (°C.) | 209 | 201 | 266 | 255 | 256 | 256 | 256 |

The vacuum on the second devolatilization zone was 24.7 in. Hg. The reaction product was extruded, cooled in a water bath, and pelletized. The pellets were dried in a vacuum over at 65° C. and 29.5 in. Hg for 48 hours. The product had a melt flow rate of 0.66 g/10 min. (230° C.). The hydrolysis of the product was 49%.

The polymer was made into blown film on a Victor blown film line using the processing conditions similar to those in Example 1 The haze of the blown film was 3% and the 60° gloss was 128.

EXAMPLE 13

An ethylene-methyl acrylate copolymer containing 20% by weight methyl acrylate and having a melt index of 150 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 7.4 lbs./hr. The screw speed was 450 rpm.

The following temperatures were measured during the process:

TABLE 15

| Zone No. | 1 | 2 | 3 | 4 | 5 | 6 | 7 |
| --- | --- | --- | --- | --- | --- | --- | --- |
| Temperature (°C.) | 188 | 199 | 276 | 253 | 257 | 260 | 262 |

The vacuum on the second devolatilization zone was 28.5 in. Hg. The reaction product was extruded, cooled in a water bath, and pelletized. The pellets were dried in a vacuum over at 65° C. and 29.5 in. Hg for 48 hours. The product had a melt flow rate of 0.22 g/10 min. (230° C.). The hydrolysis of the product was 42%.

The polymer was made into blown film on a Victor blown film line using the processing conditions similar to those in Example 1 The haze of the blown film was 4% and the 60° gloss was 122.

EXAMPLE 14

An ethylene-methyl acrylate copolymer containing 20% by weight methyl acrylate and having a melt index of 400 g/10 min. (190° C.) was fed to a Werner & Pfleiderer ZSK-58 mm twin screw extruder at a rate of 425 lbs./hr. The screw was configured to provide substantially the same mixing as provided in the ZSK-40 mm extruder in Examples 1–13. Aqueous sodium hydroxide was fed to the reaction zone on the extruder at a rate of 56 lbs./hr.

The screw speed of the extruder was at 500 rpm. The temperatures in the reaction zones were 226° C. to 338° C. The product was 71% hydrolyzed. The product had similar optical properties to the product of Example 3.

EXAMPLE 15

An ethylene-methyl acrylate copolymer containing 20% by weight methyl acrylate and having a melt index of 400 g/10 min. (190° C.) was fed to a Werner & Pfleiderer ZSK-70 mm twin screw extruder at a rate of 450 lbs./hr. The screw was configured to provide substantially the same mixing as provided in the ZSK-40 mm extruder in Examples 1–13. Aqueous sodium hydroxide was fed to the reaction zone on the extruder at a rate of 50 lbs./hr.

The screw speed of the extruder was at 580 rpm. The temperatures in the reaction zones were 330° C. to 350° C. The product was 61% hydrolyzed. The product had similar optical properties to the product of Example 3.

COMPARATIVE EXAMPLE A

An ethylene-methyl acrylate copolymer containing 20% by weight methyl acrylate and having a melt index of 20 g/10 min. (190° C.) was fed to the Werner & Pfleiderer corrosion-resistant ZSK-40 mm twin screw extruder at a rate of 100 lbs./hr. Aqueous sodium hydroxide was fed to Zone 3 on the extruder at a rate of 4.6 lbs./hr. The screw speed was 400 rpm.

The following temperatures were measured during the process:

TABLE 16

| Zone No. | 1 | 2 | 3 | 4 | 5 | 6 | 7 |
| --- | --- | --- | --- | --- | --- | --- | --- |
| Temperature (°C.) | 216 | 213 | 270 | 269 | 270 | 271 | 270 |

The vacuum on the second devolatilization zone was 27.9 in. Hg. The reaction product was extruded, cooled in a water bath, and pelletized. The pellets were dried in a vacuum over at 65° C. and 29.5 in. Hg for 48 hours. The product had a melt flow rate of 3.2 g/10 min. (190° C.). The hydrolysis of the product was 15%.

The polymer was made into blown film on a Victor blown film line using the processing conditions similar to those in Example 1. The haze of the blown film was 81%, and the 60° gloss was 35.

This Comparative Example A shows that saponifying 15% of the methyl acrylate groups to form the sodium salt of acrylic acid is insufficient at these reaction conditions to produce the low haze of compositions of this invention.

COMPARATIVE EXAMPLE B

An ethylene-methyl acrylate copolymer containing 20% methyl acrylate by weight and having a melt index of 400 g/10 min. was fed to a Werner & Pfleiderer ZSK-30 corrosion-resistant extruder at 13.2 lbs/hr. 1.73 lbs/hr. of 35% sodium hydroxide solution was fed to zone 3 of the extruder. The extruder had the configuration of elements shown in Table 1 column B.

The following extruder temperatures were measured:

TABLE 17

| Zone No. | 1 | 2 | 3 | 4 | 5 | 6 | 7 |
|---|---|---|---|---|---|---|---|
| Temperature (°C.) | 230 | 275 | 275 | 275 | 275 | 240 | 235 |

Water and the by-product methanol were removed in a two-stage devolatilization zone. The polymer strands were cooled in a water bath and pelletized. The pellets were vacuum-dried overnight at about 25 in. Hg vacuum and at 68° C.

Chemical analysis of the product indicated a degree of saponification of 49.2%. The product had a melt index (190° C.) of 0.54 g/10 min.

A ½ inch Randcastle miniextruder was used to make a cast film of about 4 inch width. The temperature at the feed zone and barrels 1A through 3A was 430° C., while the die temperature was 440° C. The film had a haze of 55% and a 60° gloss of 20.

It is believed that the poor clarity of this example results from a more dilute caustic solution and poorer mixing at these reaction conditions as compared to the conditions which produce compositions of this invention.

COMPARATIVE EXAMPLE C

An ethylene-methyl acrylate copolymer containing 20% methyl acrylate by weight and having a melt index of 400 g/10 min. was fed to a Werner & Pfleiderer ZSK-30 corrosion-resistant extruder at 13.2 lbs/hr. 2.29 lbs/hr. of 35% sodium hydroxide solution was fed to zone 3 of the extruder. The extruder had the configuration of elements shown in Table 1 column B.

The following extruder temperatures were measured:

TABLE 18

| Zone No. | 1 | 2 | 3 | 4 | 5 | 6 | 7 |
|---|---|---|---|---|---|---|---|
| Temperature (°C.) | 230 | 275 | 275 | 275 | 275 | 240 | 235 |

Water and the by-product methanol were removed in a two-stage devolatilization zone. The polymer strands were cooled in a water bath and pelletized. The pellets were vacuum-dried overnight at about 25 in. Hg vacuum and at 68° C.

Chemical analysis of the product indicated a degree of saponification of 65.2%. The product had a melt flow rate of 0.38 g/10 min. (230° C.).

A ½ inch Randcastle miniextruder was used to make a cast film of about 4 inch width. The temperature at the feed zone and barrels 1A through 3A was 430°·C., while the die temperature was 440° C. The film had a haze of 15% and a 60° gloss of 66.

This comparative example shows that a greater extent of hydrolysis provided clearer ionomer, but mixing conditions as supplied by the screw design of Table 1 column B when using 35% aqueous caustic did not appear to provide the intensive mixing and reaction conditions necessary to obtain a haze of 10% or less.

COMPARATIVE EXAMPLE D

Ethylene-methyl acrylate copolymer having 20 weight percent methyl acrylate and a 400 melt index (190° C.) was saponified with a 35% by weight aqueous solution of sodium hydroxide per the method of Comparative Example B. The product was 60% saponified and had a melt index (190° C.) of 0.06. The tensile strength in the machine direction was 1582 psi.

COMPARATIVE EXAMPLE E

Ethylene-methyl acrylate copolymer having 25 weight percent methyl acrylate and a 457 melt index (190° C.) was saponified with a 35% by weight aqueous solution of sodium hydroxide per the method of Comparative Example B. The product was 44% saponified and had a melt index (190° C.) of 0.04. The tensile strength in the machine direction was 985 psi.

EXAMPLE 16

Acid Bath Cooling of Ionomer 26.4 lbs./hr. of the ethylene-methyl acrylate copolymer of Example 1 were fed to a Werner & Pfleiderer corrosion resistant ZSK-30 twin-screw extruder having the configuration of elements given in Table 1 column C 50% aqueous sodium hydroxide was fed into zone 3 at 2.5 lb./hr. The screw speed was 500 rpm.

The following extruder temperatures were measured:

TABLE 19

| Zone No. | 1 | 2 | 3 | 4 | 5 | 6 | 7 |
|---|---|---|---|---|---|---|---|
| Temperature (°C.) | 174 | 200 | 255 | 260 | 254 | 267 | 255 |

Volatile components were removed in a two port devolatilization section, and the second port had a vacuum of 28 in. Hg. The polymer strands from a four-strand die were cooled in a 5% phosphoric acid bath which was 10 ft. long, and were then rinsed in a 2 ft. water bath and pelletized in a Conair pelletizer.

During 1.75 hours of operation, the ionomer was efficiently cooled and pelletized, and the acid bath remained acidic and clear with no evidence of dissolved polymer. Total carbon analysis of the cooling water (determined by potentiometric titration) at the end of operation showed less than 20 ppm of dissolved carbon. By contrast, when the same polymer was cooled in water, the water bath became turbid and milky-white within a few minutes of operation.

The resulting pellets were colorless, shiny, and clear.

EXAMPLE 17

This example shows a copolymer of ethylene, methyl acrylate, sodium acrylate, and acrylic acid. First, ethylene-methyl acrylate copolymer having 20 weight percent methyl acrylate and 153 melt index (190° C.) was saponified in a Werner-Pfleiderer ZSK-30 twin-screw reactive extruder using 50% aqueous sodium hydroxide and substantially the same reaction conditions as Example 16. The extent of saponification was 42%. The pelletized ionomer was clear and glossy and had a melt flow rate (230° C.) of 0.17 g/10 min.

The ionomer pellets were fed to the extruder at a rate of 12 kg/hr. 85.6% aqueous phosphoric acid was fed to Zone 3 of the extruder at a rate of 0.14 kg/hr., and the product was extruded, cooled in a water bath, and pelletized.

The product retained its clear and glossy optical properties, and the melt flow rate increased to 1.0 g/10 min. (230° C.). Film that was made on the Randcastle mini-extruder had a tensile strength in the machine direction of 2418 psi.

EXAMPLE 18

Ethylene-methyl acrylate copolymer having 20 weight percent methyl acrylate and 400 melt index (190° C.) was saponified in a ZSK-30 extruder having the configuration of elements given in Table 1 column C with 50% aqueous sodium hydroxide at a reaction temperature of about 148° C. The screw speed was 500 rpm. The copolymer was fed to the extruder at a rate of 12 kg/hr., and the product was about 54% saponified. The product was visually clear.

COMPARATIVE EXAMPLE F

Ethylene-methyl acrylate copolymer having 20 weight percent methyl acrylate and 400 melt index (190° C.) was saponified with 50% aqueous sodium hydroxide in a ZSK-30 extruder having the configuration of screw elements given in Table 1 column B at a reaction temperature of about 149° C. The screw speed was 500 rpm. The copolymer was fed to the extruder at a rate of 16 kg/hr., and the product was about 52% saponified. The product was visually cloudy.

This example shows that insufficient mixing was supplied by the screw configuration of Table 1 column B at these reaction conditions.

EXAMPLE 19

26.4 lbs./hr. of the ethylene-methyl acrylate copolymer of Example 1 were fed to a Werner & Pfleiderer corrosion resistant ZSK-30 twin-screw extruder having the configuration of elements given in Table 1 column C 50% aqueous potassium hydroxide was fed into zone 3 at the rate given in Table 20. The screw speed was 500 rpm.

The extruder temperatures were substantially the same as those given in Table 19. Volatile components were removed in a two port devolatilization section, and the second port had a vacuum of 28 in. Hg. The following table summarizes the feed rate of potassium hydroxide, the melt flow rate (230° C.), and the extent of saponification of the methyl acrylate groups.

TABLE 20

| Feed rate (lb./hr.) of 50% aqueous potassium hydroxide | Melt flow rate of ionomer of this Example | Extent of saponification |
| --- | --- | --- |
| 1.87 | 1.66 | 27 |
| 2.62 | 0.60 | 37 |
| 3.74 | 0.23 | 53 |
| 5.28 | 0.07 | 78 |

COMPARATIVE EXAMPLE G

An ethylene-methyl acrylate copolymer containing 20% methyl acrylate by weight and having a melt index of 20 g/10 min. (190° C.) was fed to a Werner & Pfleiderer ZSK-40 corrosion-resistant extruder at 100 lbs/hr. 4.7 lbs/hr. of 50% sodium hydroxide solution was fed to zone 3 of the extruder. The screw speed was 275 rpm.

The following extruder temperatures were measured:

TABLE 21

| Zone No. | 1 | 2 | 3 | 4 | 5 | 6 | 7 |
| --- | --- | --- | --- | --- | --- | --- | --- |
| Temperature (°C.) | 200 | 208 | 279 | 280 | 278 | 280 | 281 |

The vacuum on the second devolatilization zone was 27.0 in. Hg. The reaction product was extruded, cooled in a water bath, and pelletized. The pellets were dried in a vacuum over at 65° C. and 29.5 in. Hg for 48 hours. The product had a melt index of 1.6 g/10 min. (190° C.). The hydrolysis of the product was 24%.

The polymer was made into blown film on a Victor blown film line using the processing conditions similar to those in Example 1. The haze of the blown film was 97%, and the 60° gloss was 43.

The SEM micrograph shown in FIG. 2 was taken on a freeze-fractured surface of the blown film made from this ionomer.

COMPARATIVE EXAMPLE H

An ethylene-methyl acrylate copolymer having 20 weight percent methyl acrylate and a melt index of 153 g/10 min. (190° C.) was 35% hydrolyzed by the method of Comparative Example A. The melt index of this ionomer was 9.7 g/10 min. (190° C.), and the haze of a cast film was 98% the 60°, gloss was 6, and the tear strength (g/mil) in the machine direction was 33 and in the transverse direction was 41.

EXAMPLE 20

An ethylene-methyl acrylate copolymer having 20 weight percent methyl acrylate was saponified substantially by the method of Example 1. The percent hydrolysis and properties of the polymer are listed in the following Table 22.

TABLE 22

| % HYDRO-LYZED | % HAZE | 60° GLOSS | TENSILE STRENGTH, psi | | 1° SECANT MODULUS, psi | | MELT POINT TEMP. °C. | ELMENDORF TEAR STRENGTH, g/mil | | ELONGATION @ BREAK, % | |
| --- | --- | --- | --- | --- | --- | --- | --- | --- | --- | --- | --- |
| | | | MD | TD | MD | TD | | MD | TD | MD | TD |
| 35 | 13.3 | 55 | 1709 | 1445 | 7893 | 7667 | 77 | 12 | 14 | 350 | 376 |
| 42 | 1.4 | 126 | 2081 | 1928 | 14831 | 14054 | 76 | 17 | 24 | 420 | 434 |

TABLE 22-continued

| % HYDRO-LYZED | % HAZE | 60° GLOSS | TENSILE STRENGTH, psi | | 1° SECANT MODULUS, psi | | MELT POINT TEMP. °C. | ELMENDORF TEAR STRENGTH, g/mil | | ELONGATION @ BREAK, % | |
|---|---|---|---|---|---|---|---|---|---|---|---|
| | | | MD | TD | MD | TD | | MD | TD | MD | TD |
| 50 | 0.5 | 140 | 2321 | 1984 | 8193 | 7718 | 73 | 26 | 22 | 365 | 405 |

Melt point temperature was measured using a differential scanning calorimeter and standard methods well-known in the art.
Elmendorf tear strength was measured using ASTM D-1922.
Elongation at break was measured using ASTM D-882.

The hot tack strength for these ionomers is summarized in FIG. 3.

EXAMPLE 21

Samples of ethylene methyl acrylate copolymer having the methyl acrylate contents in following Table 23 were saponified to various degrees of hydrolysis using substantially the method of Example 1. In addition, ethylene methyl acrylate copolymers made by the method of U.S. Ser. No. 07/947,870, filed Sep. 21, 1992, where all of the methyl acrylate was fed to a first reaction zone of a multi-zone high-pressure polymerization reactor, were saponified to various degrees of hydrolysis. Table 23 summarizes the melt point temperatures of these ionomers.

TABLE 23

| WT. % METHYL ACRYLATE | ETHYLENE METHYL ACRYLATE COPOLYMER MADE BY METHOD OF U.S. PAT. NO. 3,350,372 | | ETHYLENE METHYL ACRYLATE COPOLYMER MADE BY METHOD OF U.S. SER. NO. 07/947,870 | |
|---|---|---|---|---|
| | % HYDROLYZED | MELT POINT TEMP., °C. | % HYDROLYZED | MELT POINT TEMP., °C. |
| 12 | 62 | 90 | 60 | 97 |
| 12 | 86 | 83 | 83 | 99 |
| 12 | — | — | 83 | 98 |
| 12 | 100 | 87 | 99 | 93 |
| 20 | — | — | 35 | 92 |
| 20 | 47 | 87 | 42 | 91 |
| 20 | 51 | 86 | 50 | 91 |
| 20 | 61 | 83 | 65 | 92 |
| 20 | 72 | 64 | — | — |
| 24 | 42 | 64 | — | — |

EXAMPLE 22

Ionomer was made substantially by the method of Example 1. This ionomer was cast coextruded individually with three polymers on a Randcastle Mini-Extruder to form three 2-layer films, where each layer was 2 mil thick. Adhesion strength of the 2-layer films was analyzed using TAPPI Uniform Method 541, "Adhesion to Non-Porous Flexible Substrates", which is incorporated by reference in its entirety herein. Ionomer/propylene film (Fina 3275) had an adhesion of 770 g/inch; ionomer/high density polyethylene (Chevron HiD® 9650) could not be separated; and ionomer/nylon (Allied Chemical's Capron 8350) had an adhesion of 80 g/inch.

The heat seal strength of the ionomer/polyethylene film above is summarized in FIG. 4.

EXAMPLE 23

Ethylene-methyl acrylate-butyl acrylate copolymer containing 10 weight percent methyl acrylate and 10 weight percent butyl acrylate is about 50% hydrolyzed substantially by the method of Example 1. This yields an ethylene-methyl acrylate-butyl acrylate-sodium acrylate copolymer. It is expected that the methyl acrylate reacts at a faster rate than the butyl acrylate, so more methyl acrylate is converted to the sodium salt than butyl acrylate. This product is useful in applications where a higher melt-point temperature is desired, such as films or bags which contact hot food or liquids.

We claim:

1. A method of making an ionomer composition comprising:

A) contacting:
  (1) a Group IA metal-containing solution with
  (2) a molten or fluid copolymer comprising alpha-olefins having from two to eight carbon atoms and esters of alpha, beta-ethylenically-unsaturated carboxylic acids having from four to twenty two carbon atoms and having a melt index between about 100 and about 2000 g/10 min., as measured by ASTM method D 1239 at 190° C.; and B) intensively mixing the copolymer and Group IA metal-containing solution at a temperature and to an extent which provides an ionomer composition having no more than ten percent haze.

2. The method of claim 1 wherein the copolymer comprises ethylene methyl acrylate copolymer.

3. The method of claim 2 wherein said copolymer has a melt index between 300 and 600 g/10 min.

4. The method of claim 1 wherein the Group IA metal-containing solution comprises aqueous metal hydroxide, where the metal is selected from the group consisting of sodium and potassium.

5. The method of claim 4 wherein the concentration of metal hydroxide in the aqueous metal hydroxide is at least 50 percent by weight.

6. The method of claim 1 wherein the intensive mixing is provided by a twin-screw extruder.

7. The method of claim 1 wherein the intensive mixing occurs at a temperature between 200° and 350° C.

8. The method of claim 7 wherein the temperature is between 275° and 350° C.

9. The method of claim 1 wherein the intensive mixing provides an ionomer composition substantially free of ionic clusters greater than 0.05 micron in size.

* * * * *